Inventor
Edward C. Cupit.

By Clarence A. O'Brien
and Hyman Berman
Attorneys

Patented May 20, 1941

2,243,029

UNITED STATES PATENT OFFICE 2,243,029

DEFLECTOR FOR AUTOMOBILE WIND-
SHIELDS

Edward C. Cupit, Reno, Nev.

Application December 7, 1939, Serial No. 308,060

1 Claim. (Cl. 296—91)

This invention relates to improvements in deflectors for windshields of automobiles and other vehicles, and the principal object of the invention is to provide simple and inexpensive means for deflecting bugs, insects, snow, air currents, and other foreign objects upwardly from the windshield so as not to obscure the vision of the operator while driving.

Another object of the invention is to provide a device of this character which may be easily attached and detached to the cowl of a vehicle.

Another object of the invention is to provide a device of this character which is characterized by simplicity, durability of construction and inexpensiveness to manufacture.

Other objects of the invention will be apparent during the course of the following description.

With the foregoing in view the invention resides in the novel subject matter hereinafter described and claimed, the description being supplemented by the accompanying drawing in which:

Figure 1:
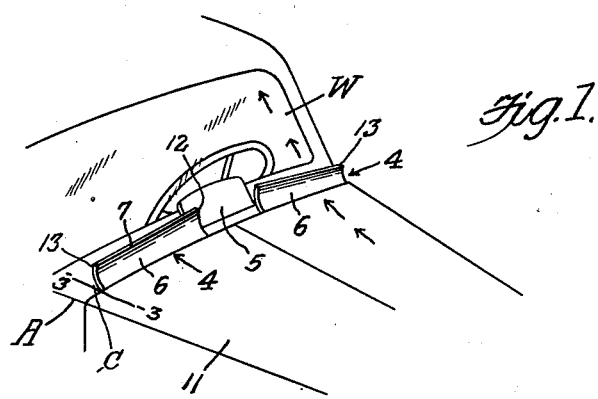
Figure 1 is a fragmentary perspective view of the front end of an automobile showing the device applied when in use.
Figure 2:
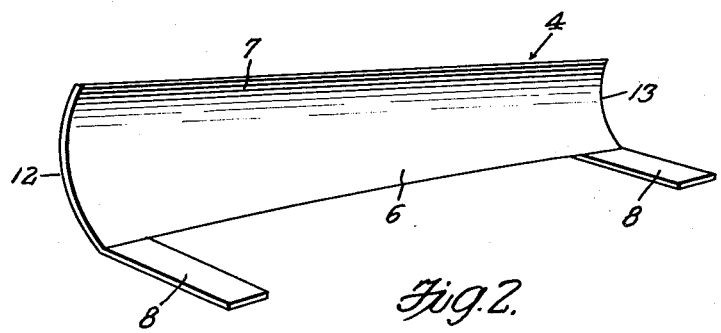
Figure 2 is a perspective view of the device constructed in accordance with the principles of my invention.
Figure 3:
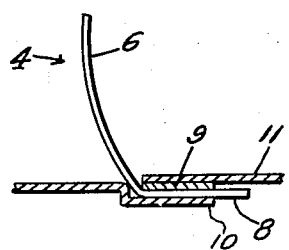
Figure 3 is a sectional view taken substantially on the line 3—3 of Figure 1.

In the drawing, wherein for the purpose of illustration is shown a preferred embodiment of the invention, the numeral 4 generally designates a deflector for disposition on the cowl C of an automobile or other vehicle A, and as shown in Figure 1 of the drawing, the deflector is in juxtaposition to the windshield W. As shown to advantage in Figure 1 of the drawing, I make use of a pair of deflectors 4 which are positioned on the respective sides of the cowl, and the dual-type deflectors are bridged by the cowl vent 5.

The deflectors 4 are constructed from a strip of sheet metal 6, such as tin, or the like, and are preferably finished with chromium, or may be highly polished to present a smooth surface for deflecting, or diverting snow, air currents, insects, and other foreign objects upwardly from the windshield and over the top of the vehicle as indicated by the arrows in Figure 1. As illustrated in the drawing, the deflectors 4 are slightly curved in cross-section, and the top 7 thereof is bent forwardly a slight degree. Thus, as the air currents, insects, or other objects travel toward the car while the latter is in motion, they will strike against the deflectors and be diverted upwardly over the top of the vehicle, thereby insuring a clear vision for the operator of the vehicle. The numeral 8 designates a pair of tongues which are stamped from the strip of sheet metal 6 and are an integral part of the deflector, and project at right angles thereto. These tongues 8 are slipped under the lacing 9 of the cowl 10 under the hood 11 of the vehicle A. Due to the lightness of the deflectors, the cowl lacing 9 is of sufficient strength to hold the deflectors in position while the hood 7 is raised. However, when the hood is closed a tight contact is afforded by the pressure of the hood 11 on the tongues 8, thereby preventing accidental displacement of the deflectors.

In the preferred form of construction the deflectors 4 are preferably horizontally inclined. That is to say, the end 12 adjacent the intermediate portion of the windshield is slightly higher than the opposite end 13, thus conforming substantially to the contour of the cowl C of the vehicle.

From the foregoing it will be seen that I have provided a very novel and unique deflector for disposition on the cowl of an automobile or other vehicle for diverting snow, air currents, insects, and other foreign objects away from the windshield, and over the top of the vehicle, thus preventing the windshield from becoming covered with such foreign substance, with the result that the driver of the vehicle will always have a clear and unobstructed vision of the road ahead.

It is thought that persons skilled in the art to which the invention relates will be able to obtain a clear understanding of the invention, after considering the description in connection with the drawing. Therefore, a more lengthy description is regarded as unnecessary.

Since excellent results are obtainable from the details disclosed, they are preferably followed. However, within the scope of the invention as claimed, numerous modifications may, of course, be made.

Having described the invention what is claimed as new is:

In combination with an automobile having a cowl provided with a depression at its front edge and a gasket fastened in said depression and adapted to be engaged by the rear edge of the hood of the automobile, a pair of deflectors each including a body part and forwardly extending fingers connected at the rear ends with the lower edge of the body part at the ends thereof, said fingers extending under the gasket to hold the deflector in place when the hood is raised.

EDWARD C. CUPIT.